(12) United States Patent
Ha et al.

(10) Patent No.: US 12,338,533 B2
(45) Date of Patent: *Jun. 24, 2025

(54) HIGH-STRENGTH HOT-DIP GALVANIZED STEEL SHEET WITH EXCELLENT FORMABILITY AND PROCESS FOR PRODUCING SAME

(71) Applicant: POSCO CO., LTD, Pohang-si (KR)

(72) Inventors: Yu-Mi Ha, Gwangyang-si (KR); Jun-Sung Yeom, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/035,924

(22) PCT Filed: Oct. 27, 2021

(86) PCT No.: PCT/KR2021/015231
§ 371 (c)(1),
(2) Date: May 8, 2023

(87) PCT Pub. No.: WO2022/103024
PCT Pub. Date: May 19, 2022

(65) Prior Publication Data
US 2024/0011141 A1     Jan. 11, 2024

(30) Foreign Application Priority Data
Nov. 12, 2020   (KR) .................. 10-2020-0150899

(51) Int. Cl.
*C23C 2/40*     (2006.01)
*C21D 8/02*     (2006.01)
(Continued)

(52) U.S. Cl.
CPC .............. *C23C 2/40* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS 7,608,156 B2   10/2009   Ono et al.
9,340,860 B2   5/2016    Furuhashi et al.
(Continued)

FOREIGN PATENT DOCUMENTS

CN        1386140 A      12/2002
CN        102094149 A    6/2011
(Continued)

OTHER PUBLICATIONS

International Search Report—PCT/KR2021/015231 dated Feb. 17, 2022.
(Continued)

*Primary Examiner* — Seth Dumbris
(74) *Attorney, Agent, or Firm* — CANTOR COLBURN LLP

(57) ABSTRACT

Provided are a high-strength hot-dip galvanized steel sheet with excellent formability and a process for producing same. The steel sheet comprises, in mass %: 0.005 to 0.009% of C; 0.05% or less of Si; 0.3 to 0.8% of Mn; 0.06 to 0.09% of P; 0.01% or less of S; 0.005% or less of N; 0.1% or less of Al; 0.05 to 0.08% of Mo; 0.01 to 0.03% of Ti; 0.03 to 0.045% of Nb; 0.06 to 0.1% of Cu; 0.0015% or less of B; and a balance of Fe and inevitable impurities, and 95% or more of ferrite in terms of area fraction. The ferrite has an average grain size of 15 μm or less, with ultrafine grains of 6 μm or less occupying 5 to 10% in a 1 mm×1 mm, and the steel sheet has a surface nanohardness value of 1 to 1.5 GPa.

2 Claims, 1 Drawing Sheet

(51) Int. Cl.

| | |
|---|---|
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/16* | (2006.01) |
| *C23C 2/06* | (2006.01) |

(52) U.S. Cl.
CPC ............ *C21D 8/0273* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C23C 2/06* (2013.01); *C21D 2211/005* (2013.01); *Y10T 428/12799* (2015.01)

(56) References Cited

U.S. PATENT DOCUMENTS

| | | | |
|---|---|---|---|
| 11,453,923 | B2 | 9/2022 | Friedel et al. |
| 2003/0015263 | A1* | 1/2003 | Kami .................. C21D 8/0236 148/320 |
| 2015/0017472 | A1 | 1/2015 | Kimura et al. |
| 2015/0203948 | A1 | 7/2015 | Sugiura et al. |
| 2017/0283923 | A1* | 10/2017 | Ta ........................ C21D 8/0226 |
| 2018/0044751 | A1* | 2/2018 | Takashima ............ C21D 6/002 |
| 2019/0055621 | A1 | 2/2019 | Kizu et al. |
| 2020/0087761 | A1 | 3/2020 | Aarnts et al. |

FOREIGN PATENT DOCUMENTS

| | | |
|---|---|---|
| CN | 104093873 A | 10/2014 |
| CN | 104775071 A | 7/2015 |
| CN | 108884532 A | 11/2018 |
| EP | 1291448 | 6/2006 |
| EP | 1669472 A2 | 6/2006 |
| EP | 2873746 A1 | 5/2015 |
| EP | 3372703 A1 | 9/2018 |
| JP | H05228501 A | 9/1993 |
| JP | 2000234143 A | 8/2000 |
| JP | 2000303141 A | 10/2000 |
| JP | 2001303180 | 10/2001 |
| JP | 2001303180 A * | 10/2001 |
| JP | 2001335887 A | 12/2001 |
| JP | 2002012920 A | 1/2002 |
| JP | 2004169160 | 6/2004 |
| JP | 2005187939 A | 7/2005 |
| JP | 2006016630 | 1/2006 |
| JP | 2008169427 | 7/2008 |
| JP | 2008214657 A | 9/2008 |
| JP | 2008214700 A | 9/2008 |
| JP | 2019532172 A | 11/2019 |
| JP | 2019534949 | 12/2019 |
| KR | 20020019124 | 3/2002 |
| KR | 20100001334 | 1/2010 |
| KR | 20100025923 | 3/2010 |
| KR | 20150072806 | 6/2015 |

OTHER PUBLICATIONS

European Search Report—European Application No. 21892194.8 issued on Jul. 5, 2024, citing JP 2008-169427, EP 1 669 472, JP 2001-303180, JP 2008-214657, EP 3 372 703, and EP 2 873 746.
Japanese Office Action—Japanese Application No. 2023-528332 issued on May 28, 2024, citing JP 2008-214700, JP 2005-187939, JP 2008-214657, JP 2002-012920, CN 102094149, JP 2019-532172, and JP H05-228501.
Chinese Office Action—Chinese Application No. 202180076662.5 issued on Dec. 31, 2024, citing CN 104775071, CN 104093873, CN 108884532, CN 1386140, JP 2000-234143, JP 2000-303141, JP 2001-303180, and JP 2001-335887.

* cited by examiner

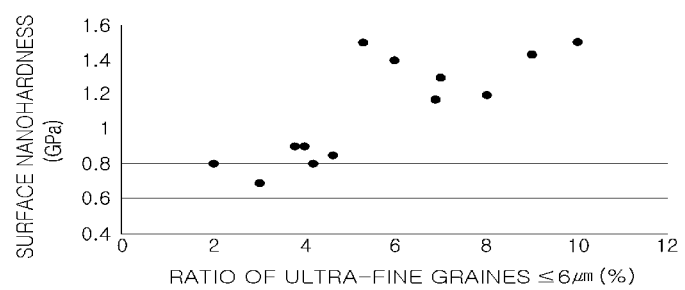

HIGH-STRENGTH HOT-DIP GALVANIZED STEEL SHEET WITH EXCELLENT FORMABILITY AND PROCESS FOR PRODUCING SAME

TECHNICAL FIELD

The present disclosure relates to manufacturing an ultra-high strength ultra-low carbon steel plated steel sheet, having excellent formability and for weight reductions for automobiles, and more particularly, to a high-strength hot-dip galvanized steel sheet that can be preferably applied as a material for exterior plates for automobiles and a method for manufacturing the same.

BACKGROUND ART

A cold-rolled steel sheet, processed by press working, or the like is used as an exterior plate material for automobiles, and high formability is generally required. In addition, from a viewpoint of preventing global warming, as a carbon dioxide emission control method, improving fuel efficiency of automobiles, such as setting a target for improving new vehicle fuel costs and introducing a preferential tax system for low-fuel consumption automobiles, is required. To improve the fuel efficiency of automobiles, weight reduction of automobile bodies is an effective means, and from the viewpoint of such weight reduction, slimming of steel sheets for automobile bodies is required. Meanwhile, from the viewpoint of ensuring the safety of automobile bodies, high-strength of steel sheets for automobile bodies is required. As a steel sheet for automobile bodies satisfying the slimming and high-strength requirements of such steel sheets and which is pressed into complex shapes, a zinc-based plated high tensile strength steel sheet having excellent surface appearance and good press formability, is required.

In order to improve the formability of steel sheets for automobiles, there may be so-called interstitial free steel (IF) steel by adding Ti or Nb alone or in combination thereof to ultra-low carbon cold-rolled steel sheets and precipitating solid-solution elements such as C, N, and S in a form of carbides and nitrides, and increasing elongation and a plastic deformation ratio, to improve the formability thereof. Therefore, conventionally, an aging phenomenon due to a solid solution element is limited by a method of precipitating a solid solution element by adding a carbonitride forming element such as titanium as well as achieving high purification in a steelmaking step. In addition, in a high tensile strength steel sheet, in order to improve the strength of the steel sheet, incorporation of solid solution strengthening elements such as Si, Mn, and P into steel has been performed.

In particular, P is added to steel to increase the strength of the steel sheet, but P is an element that is very easy to be segregated, and P, segregated on a surface of a slab is elongated in a longitudinal direction of the steel sheet by hot rolling or cold rolling to form a P-concentrated layer on a surface of a coil. In this P-concentrated layer, alloying is delayed during plating, which causes linear defects in an alloying hot-dip galvanized steel sheet. Regarding this problem, as a method for manufacturing an alloyed hot-dip galvanized steel sheet using a steel sheet having a content of P of 0.03% or more as a base material, a method of performing grinding of a surface of the steel sheet with a grinding amount according to an amount of P in order to solve non-uniformity of the surface of the steel sheet, and performing an alloying treatment in an alloying furnace of an induction heating method has also been proposed (Patent Document 1).

In these conventional techniques, in order to prevent linear defects in the alloying hot-dip galvanized steel sheet, for example, when a ultra-low carbon Ti-added steel sheet having a P content of 0.03% or more is used, a surface thereof was scarfed by 3 mm or more in a continuous casting operation, and the surface was ground to 5 μm or more in an operation of the steel sheet before plating. As a result, surface quality was ensured by preventing the occurrence of shape defects after plating, but this has become a cause of a decrease in yield. Therefore, there is a demand for development of a method for manufacturing a steel sheet capable of manufacturing a steel sheet having excellent surface appearance and high formability and high strength, while securing yield.

Prior Art Document (Patent Document 1) Japanese Patent Publication No. 2004-169160

SUMMARY OF INVENTION

Technical Problem

An aspect of the present disclosure is to provide a high-strength hot-dip galvanized steel sheet having excellent formability and distinctness of image after painting when P, Nb, and Ti are added to ultra-low carbon steel applied to automobile exterior plates requiring formability to control distribution of grain size, and a method for manufacturing the same.

The subject of the present invention is not limited to the above. The subject of the present invention will be understood from the overall content of the present specification, and those of ordinary skill in the art to which the present invention pertains will have no difficulty in understanding the additional subject of the present invention.

Solution to Problem

According to an aspect of the present disclosure, provided is a high-strength hot-dip galvanized steel sheet having excellent formability, the steel sheet including in mass %:
0.005 to 0.009% of C; 0.05% or less of Si; 0.3 to 0.8% of Mn; 0.06 to 0.09% of P; 0.01% or less of S; 0.005% or less of N; 0.1% or less of S·Al; 0.05 to 0.08% of Mo; 0.01 to 0.03% of Ti; 0.03 to 0.045% of Nb; 0.06 to 0.1% of Cu; 0.0015% or less of B; and a balance of Fe and inevitable impurities, C, Ti, and Nb satisfy Relation 1, the steel sheet has a microstructure including 95% or more of ferrite in terms of area fraction, the ferrite has an average grain size of 15 μm or less, with ultrafine grains of 6 μm or less occupying 5 to 10% in a 1 mm×1 mm area, and the steel sheet has a surface nanohardness value of 1 to 1.5 GPa, $$0.05 \leq [(Nb(48/93))+(Ti(93/48))+(C(12/48))] \leq 0.065 \quad \text{[Relation 1]}$$

The hot-dip galvanized steel sheet may have tensile strength of 440 MPa or more and an r value of 1.4 or more.

According to another aspect of the present disclosure, provided is a method for manufacturing a high-strength hot-dip galvanized steel sheet having excellent formability, the method including operations of: heating a steel slab, including the above-described steel composition, to 1100 to 1300° C.;

hot-rolling the heated steel slab to a finish rolling temperature of 920 to 970° C., and then coiling the steel slab at a temperature of 600 to 650° C. to manufacture a hot-rolled steel sheet;

pickling the coiled hot-rolled steel sheet and then cold-rolling the hot-rolled steel sheet at a reduction rate of 70 to 83% to obtain a cold-rolled steel sheet;

annealing the cold-rolled steel sheet within a temperature range of 760 to 830° C., and then performing hot-dip galvanizing; and performing an alloying heat treatment of the hot-dip galvanized steel sheet in a temperature range of 500 to 560° C.

The hot-dip galvanized steel sheet subjected to the alloying heat treatment may be temper-rolled by 0.6 to 1.2% using a skin pass roll having roughness (Ra) of 1.0 to 1.6 μm.

Advantageous Effects of Invention

As set forth above, since the hot-dip galvanized steel sheet of the present disclosure having the configuration as described above has excellent formability and high strength, the hot-dip galvanized steel sheet may be stably used as a steel sheet for exterior plates for automobiles. Therefore, an application range of the high-strength cold-rolled steel sheet containing P may be expanded to an automobile body, for example, to a side outer panel, or the like, which has not been done to date, and as a result, the automobile body may be further reduced in weight.

BRIEF DESCRIPTION OF DRAWINGS

FIG. 1 is a graph illustrating a correlation between a ratio of ultra-fine grains having an average grain size of 6 μm or less and surface nanohardness in Examples of the present disclosure.

BEST MODE FOR INVENTION

Hereinafter, the present disclosure will be described.

In order to solve the above-described problems of the above-described problems of the prior art, as a result of conducting in-depth research to solve the above-mentioned problems of the prior art, the present inventors have found that it is possible to manufacture a steel sheet having high formability and high strength for exterior plates, securing formability through minimization of solid-solution elements such as carbon (C), nitrogen (N), and sulfur (S), by adding titanium (Ti) and/or niobium (Nb), which are strong carbonitride forming elements, in steel and having excellent surface quality with tensile strength of 440 MPa or more, by adding P, Mo, and the like, thereby completing the present disclosure. In general, a steel sheet for exterior plates for automobiles must satisfy press formability such as deep drawability as well as high tensile strength. Therefore, as a base material of the alloyed hot-dip galvanized steel sheet of the present disclosure, in order to improve workability, a high tensile strength steel sheet, having ultra-low carbon steel as a basic component, and to which reinforcing elements such a Mn, and P were added, was used.

Therefore, from this point of view, provided is a high-strength hot-dip galvanized steel sheet having excellent formability in the present disclosure, the steel sheet including in mass %: 0.005 to 0.009% of C; 0.05% or less of Si; 0.3 to 0.8% of Mn; 0.06 to 0.09% of P; 0.01% or less of S; 0.005% or less of N; 0.1% or less of S·Al; 0.05 to 0.08% of Mo; 0.01 to 0.03% of Ti; 0.03 to 0.045% of Nb; 0.06 to 0.1% of Cu; 0.0015% or less of B; and a balance of Fe and inevitable impurities, C, Ti, and Nb satisfy Relation 1, the steel sheet has a microstructure including 95% or more of ferrite in terms of area fraction, the ferrite has an average grain size of 15 μm or less, with ultrafine grains of 6 μm or less occupying 5 to 10% in a 1 mm×1 mm area, and the steel sheet has a surface nanohardness value of 1 to 1.5 GPa.

First, the alloy components of the cold-rolled steel sheet constituting a base of the hot-dip galvanized steel sheet of the present disclosure and the reason for limiting the content thereof will be described. Meanwhile, "%" herein means "% by weight" unless otherwise specified.

Carbon (C): 0.005 to 0.009%

Carbon (C), as an interstitial solid-solution element, has a great effect on formation of a texture of steel sheets during cold rolling and annealing process, and requires addition of at least 0.005% of Carbon (C) for this purpose. However, when an amount of carbon, dissolved in steel increases, growth of grains having {111} gamma (γ)-fiber textures, advantageous for drawing, is suppressed, and growth of grains having {110} and {100} textures is promoted, so that drawability of an annealed sheet deteriorates. Furthermore, when the content of C exceeds 0.009%, a content of Ti and Nb, required to precipitate the same as carbides increases, which is disadvantageous in terms of economic efficiency, and pear e may be generated to deteriorate formability. Therefore, in the present disclosure, the content of C is preferably limited to a range of 0.005 to 0.009%.

Silicon (Si): 0.05% or Less (Excluding 0%)

Silicon (Si) is an element contributing to an increase in strength by solid solution strengthening. When the content of Si exceeds 0.05%, surface scale defects are caused to deteriorate plating surface properties, so in the present disclosure, the content of Si is preferably managed to 0.05% or less.

Manganese (Mn): 0.3 to 0.8%

Manganese (Mn) is a solid solution strengthening element not only contributing to increase in strength but also serving to precipitate S in steel as MnS. When the content of Mn is less than 0.3%, there is a concern about deterioration in strength. On the other hand, when the content of Mn exceeds 0.8%, surface problems due to oxides may occur, so the content of Mn is preferably limited to 0.3 to 0.8%.

Phosphorous (P): 0.06 to 0.09%

Phosphorous (P) is the most effective element for securing strength of steel, having the most excellent solid-solution effect, and without significantly impairing drawability. When the content of P is less than 0.06%, it is impossible to secure the desired strength. On the other hand, when the content of P exceeds 0.09%, secondary brittleness and surface streak defects due to P segregation may occur. It is preferable to limit the content of P to a range of 0.06 to 0.09%.

Molybdenum (Mo): 0.05 to 0.08%

Molybdenum (Mo) is an element having high affinity with P (phosphorus) and serves to suppress P segregation. In order to secure high strength in ultra-low carbon steel, P should be inevitably used, so Mo may be added in an appropriate amount to partially contribute to improving surface defects caused by P segregation. When the content of Mo is less than 0.05%, it may not be significantly effective for the desired surface improvement. On the other hand, when the content of Mo exceeds 0.8%, the price thereof may be expensive so that cost competitiveness may be lowered, so the content of Mo is preferably limited to a range of 0.05 to 0.08%.

Sulfur (S): 0.01% or less, Nitrogen (N): 0.005% or Less

Sulfur (S) and Nitrogen (N) are unavoidably added as impurities present in steel, and it is preferable to control the contents of Sulfur (S) and Nitrogen (N) an as low as possible in order to secure excellent welding characteristics. In the present disclosure, the content of S is preferably controlled to 0.01% or less, and the content of N is preferably controlled to 0.005% or less.

Aluminum (Al): 0.1% or Less (Excluding 0%)

Aluminum (Al) contributes to improving drawability and ductility of steel by precipitating AlN. However, if the content of Al exceeds 0.1%, there may be a problem that internal defects of the steel sheet due to excessive formation of Al inclusions occur during a steelmaking operation, so the content of Al is preferably controlled to 0.1% or less.

Titanium (Ti): 0.01 to 0.03%

Titanium (Ti) is an element greatly contributing to improving drawability of the steel sheet by reacting with dissolved carbon and dissolved nitrogen to precipitate Ti-based carbonitrides during hot rolling. When the content of Ti is less than 0.01%, carbonitrides may not be sufficiently precipitated, resulting in poor drawability. On the other hand, when the content of Ti exceeds 0.03%, it is difficult to manage inclusions during the steelmaking operation, and inclusion property defects may occur. The content of Ti is preferably limited to a range of 0.01 to 0.03%.

Niobium (Nb): 0.03 to 0.045%

Niobium (Nb) the most effective element for producing very fine grains through rolling and cooling processes as a non-recrystallized region of an austenite region widens at a high temperature due to the hot rolling solute drag and precipitate pinning effect. When the content of Nb is less than 0.03%, a grain size refinement effect is insignificant as a range of the non-recrystallized temperature region of austenite in steel is narrowed. On the other hand, if the content of Nb exceeds 0.045%, the high-temperature strength increases, causing difficulties in hot rolling, so the content of Nb is preferably limited to a range of 0.03 to 0.045%.

Boron (B); 0.003% or Less (Excluding 0%)

Boron (B) is an element, added to prevent secondary processing brittleness due to the addition of P in steel, but when the content of B exceeds 0.003%, it accompanies a decrease in ductility of the steel sheet, so the content of B is preferably limited to 0.003% or less.

Copper (Cu): 0.04 to 0.1%

Copper (Cu) is an element that is difficult to be removed, when adjusting the steel composition by steelmaking, and is contained in a trace amount (e.g., 0.04% or more). However, if when the content of Cu exceeds 0.1%, matters like unintentional pattern, mark or trace are easily generate n the hot-dip galvanized steel sheet, leading to grain boundary embrittlement and cost increases, so it is preferable to limit Cu to a range of 0.04 to 0.1%.

Relation 1

In the present disclosure, it is required to control the contents of C, Ti and Nb so that a value, defined by the following Relation 1 satisfies 0.05 to 0.065. The reason why Relation 1 is set in the present disclosure is that the most effective elements for grain size refinement are Ti and Nb, and these two elements affect recrystallization behavior in a solid solution state and/or in a precipitate state in combination with C. Therefore, in order to achieve the object pursued by the present disclosure, it is important to control the contents of C, Ti and Nb.

If the value, defined in the following Relation 1 is less than 0.05, the grain size refinement may not be sufficiently performed, so that the desired strength may not be secured, or as an amount of dissolved C increases, surface streak defects may occur due to a yield point phenomenon. On the other hand, if the value exceeds 0.065, as an addition amount of Ti and Nb elements relatively increases, there is a problem of losing competitiveness in terms of cost.

$$0.05 \leq [(Nb(48/93))+(Ti(93/48))+(C(12/48))] \leq 0.065 \quad \text{[Relation 1]}$$

In addition, a balance of Fe and inevitable impurities are included. The addition of effective components, other than the above composition is not excluded.

In the present disclosure, the steel sheet is a hot-dip galvanized steel sheet of a base of ultra-low carbon steel having a C content of 0.009% or less, so that a microstructure thereof is composed of a single-phase ferrite structure. However, since the single-phase ferrite structure may include other inevitably formed structures, an alloy microstructure of the present disclosure has 95% or more of ferrite in terms of area fraction, and a small amount of pearlite, or the like may remain as a residual component.

In addition, it is preferable that an average grain size of crystal gains of a microstructure of the cold-steel sheet, a base of the hot-dip galvanized steel sheet of the present disclosure, is preferably 15 µm or less. When the average particle size exceeds 15 µm or less, the strength desired by the present disclosure may not be sufficiently secured.

Furthermore, in the base cold-rolled steel sheet of the present disclosure, it is preferable that ultra-fine grains of 6 µm or less have a ratio of 5 to 10% within an area of 1 mm×1 mm. By having such a ratio, a hot-dip galvanized steel sheet having excellent formability may be obtained. When the ratio is less than 5%, it is not possible to sufficiently secure the strength desired by the present invention, and if it exceeds 10%, the strength is too high and the elongation is reduced, resulting in poor formability.

In addition, a surface hardness value of the cold-rolled steel sheet of the present disclosure is preferably controlled in a range of 1 to 1.5 GPa in consideration of securing surface distinctness of image after painting.

Next, a method for manufacturing a high-strength hot-dip galvanized steel sheet having excellent formability according to the present disclosure will be described.

According to another aspect of the present disclosure, provided is a method for manufacturing a high-strength hot-dip galvanized steel sheet having excellent formability, the method including operations of: heating a steel slab satisfying the above composition at 1100 to 1300° C.; hot-rolling the heated steel slab to a finish rolling temperature of 920 to 970° C., and then coiling the steel slab at a temperature of 600 to 650° C. to manufacture a hot-rolled steel sheet; pickling the coiled hot-rolled steel sheet and then cold-rolling the hot-rolled steel sheet at a reduction rate of 70 to 83% to obtain a cold-rolled steel sheet; annealing the cold-rolled steel sheet within a temperature range of 760 to 830° C., and then performing hot-dip galvanizing; and performing an alloying heat treatment of the hot-dip galvanized steel sheet in a temperature range of 500 to 560° C.

First, in the present disclosure, a steel slab having the above-described composition is heated in a temperature range of 1100 to 1300° C. When the heating temperature is less than 1100° C., a problem in production during rolling load in an FM (finishing mill) section may occur, and when the heating temperature exceeds 1100° C., surface scale defects may occur.

Subsequently, in the present disclosure, the heated steel slab is hot-rolled to a finish rolling temperature of 920 to 970° C., and then coiled at a temperature of 600 to 650° C. to manufacture a hot-rolled steel sheet.

In the present disclosure, it is preferable to limit the finish rolling temperature to 920 to 970° C. When the finish rolling temperature is less than 920° C., coarse grains in a surface portion may be generated, resulting in a problem of a non-uniform material, and when the finish rolling temperature exceeds 970° C., a grain size may not be sufficiently fine, resulting in a problem of an insufficient material.

In the present disclosure, it is preferable to manage the coiling temperature in a range of 600 to 650° C. When the coiling temperature is less than 600° C., precipitates such as Ti (Nb) C, or the like, are not generated, and Ti and Nb are increased, and as dissolved Ti and Nb increase, Ti and Nb are finely precipitated as TiC and Ti (Nb) C during heating in the annealing process, or Ti and Nb exist in a solid-solution state, thereby affecting recrystallization and particle growth inhibition, so that a problem may occur in securing strength and elongation to be invented. On the other hand, when the coiling temperature exceeds 630° C., problem of surface deterioration may occur due to secondary scale generation.

In the present disclosure, a pickling process for removing surface scales of the coiled hot-rolled steel sheet is performed, and then cold-rolled at a reduction rate of 70 to 83% to manufacture a cold-rolled steel sheet. When the cold rolling reduction rate is less than 70%, a {111} texture does not grow sufficiently, resulting in poor formability. On the other hand, when the cold rolling reduction rate exceeds 83%, there is a problem because rolling roll load is very severe during on-site manufacturing and the shape is deteriorated. Therefore, the reduction ratio is preferably limited to 70 to 83%, more preferably limited to 74 to 80%.

Subsequently, hot-dip galvanizing or alloying hot-dip galvanizing is performed on the cold-rolled steel sheet prepared as described above through an annealing process.

When the cold-rolled steel sheet is annealed, annealing should be performed at a temperature, higher than a recrystallization temperature within a temperature range of 760 to 830° C. By annealing the cold-rolled steel sheet at a temperature, equal to or higher than the recrystallization temperature, deformation caused by rolling may be removed, and softened so that workability can be improved.

The annealed cold-rolled steel sheet is directly hot-dip galvanized in a continuous hot-dip galvanizing line.

In the present disclosure, alloying heat treatment may be performed on the prepared hot-dip galvanized steel sheet. The alloying heat treatment is performed within a range of 300 to 560° C. after hot-dip galvanizing. When the alloying heat treatment temperature is less than 500° C., alloying does not proceed sufficiently. On the other hand, if the alloying heat treatment temperature exceeds 560° C., excessive alloying proceeds and a plating layer becomes embrittled, which may cause problems such as peeling of the plating by processing such as pressing.

In this case, in the present disclosure, if necessary, temper rolling may be performed at 0.6 to 1.2% using a skin pass roll having roughness (Ra) of 1.0 to 1.6 μm with respect to the hot-dip galvanized steel sheet subjected to the alloying heat treatment.

MODE FOR INVENTION

Hereinafter, the present disclosure will be described in more detail with reference to Examples.

Example

After reheating a steel slab with a thickness of 250 mm having an alloy composition illustrated in Table 1 below to 1250° C., hot rolling, cold rolling, continuous annealing, and alloying hot-dip galvanizing were performed under the same conditions as in Table 2 below to prepare a hot-dip galvanized steel sheet.

For each of the prepared hot-dip galvanized steel sheets, a tensile property, an r value (Lankford value), which as an index of deep drawing, grain size and distribution ratio, and surface nanohardness, were measured. A measurement method thereof is described below.

For a tensile test, YS, TS, and T-El were measured. Here, IS, TS, and T-El mean yield strength, tensile strength, and breaking elongation, respectively, and the tensile test was performed on a test piece obtained in accordance with a JIS No. 5 standard. As a result of these measurements, a case in which the tensile strength is 440 MPa or more was regarded as a pass.

Meanwhile, to evaluate an r value, which is an index of deep drawing, JIS5 tensile to specimens were obtained from alloying hot-dip galvanized steel sheets to a rolling direction, for three directions: a parallel direction, a 45° direction, and a perpendicular direction, and the r value of each test piece was measured. For example, the r value is measured by measuring a change value of a thickness of the sheet and a change value of a width of the sheet at the time of performing about 15% tensile deformation in the above-described tensile test, and calculating a ratio of the change value of the width of the sheet to the thickness of the sheet. Then, when the r value, parallel to the rolling direction was set to $r_0$, the r value in the 45° direction was set to $r_{45}$, and the r value in the perpendicular direction was set to $r_{90}$, the r value in each direction was calculated by Equation A.

$$A = r_0 + 2 \cdot r_{45} + r_{90}/4 \quad \text{[Equation A]}$$

The grain size and distribution thereof were evaluated using TSL OIM analysis software through EBSD measurement. In addition, surface nanohardness is a value measured by a depth indentation of 500 nm after performing a pretreatment through surface electropolishing. It is preferable that an average value thereof should be 1 to 1.5 GPa by observing a total of 5 places.

TABLE 1

| Steel type | Alloy composition components (by weight %) | | | | | | | | | | Relation 1 |
|---|---|---|---|---|---|---|---|---|---|---|---|
| | C | Si | P | Mo | Mn | Cu | S | Ti | Nb | B | |
| Inventive steel 1 | 0.0056 | 0.025 | 0.08 | 0.05 | 0.6 | 0.08 | 0.0023 | 0.02 | 0.039 | 0.0008 | 0.060 |

TABLE 1-continued

| Steel type | Alloy composition components (by weight %) | | | | | | | | | | Relation 1 |
|---|---|---|---|---|---|---|---|---|---|---|---|
| | C | Si | P | Mo | Mn | Cu | S | Ti | Nb | B | |
| Inventive steel 2 | 0.0062 | 0.03 | 0.078 | 0.053 | 0.51 | 0.07 | 0.0034 | 0.018 | 0.041 | 0.0005 | 0.058 |
| Inventive steel 3 | 0.007 | 0.031 | 0.081 | 0.0576 | 0.8 | 0.08 | 0.0021 | 0.019 | 0.04 | 0.0006 | 0.059 |
| Inventive steel 4 | 0.0058 | 0.034 | 0.075 | 0.062 | 0.72 | 0.069 | 0.003 | 0.017 | 0.042 | 0.0007 | 0.056 |
| Inventive steel 5 | 0.0066 | 0.028 | 0.077 | 0.054 | 0.59 | 0.078 | 0.0028 | 0.021 | 0.042 | 0.0006 | 0.064 |
| Inventive steel 6 | 0.0084 | 0.024 | 0.081 | 0.08 | 0.5 | 0.1 | 0.0015 | 0.019 | 0.038 | 0.0009 | 0.059 |
| Comparative steel 1 | 0.003 | 0.05 | 0.059 | 0.06 | 0.8 | 0.13 | 0.0054 | 0.032 | 0.035 | 0.002 | 0.081 |
| Comparative steel 2 | 0.002 | 0.1 | 0.04 | 0.01 | 0.5 | 0.02 | 0.0022 | 0.05 | 0.021 | 0.001 | 0.108 |
| Comparative steel 3 | 0.0056 | 0.03 | 0.08 | 0.04 | 0.72 | 0.05 | 0.0028 | 0.01 | 0.046 | 0.008 | 0.042 |
| Comparative steel 4 | 0.008 | 0.045 | 0.078 | 0.056 | 0.7 | 0.09 | 0.0034 | 0.005 | 0.032 | 0.006 | 0.042 |

* In Table 1, Al and N were contained in a range of 0.02% and 0.0005%, respectively, in all steel types, a balance being Fe and unavoidable impurities.

TABLE 2

| Steel type | FDT (° C.) | CT (° C.) | Cold reduction rate (%) | Annealing temperature (° C.) | GA alloying temperature (° C.) | Reference |
|---|---|---|---|---|---|---|
| Inventive steel 1 | 925 | 622 | 77 | 770 | 540 | Inventive example 1 |
| | 930 | 680 | 72 | 845 | 530 | Comparative example 1 |
| | 890 | 631 | 77 | 800 | 545 | Comparative example 2 |
| Inventive steel 2 | 932 | 620 | 77 | 779 | 535 | Inventive example 2 |
| | 925 | 625 | 76 | 835 | 535 | Comparative example 3 |
| | 880 | 650 | 65 | 780 | 540 | Comparative example 4 |
| Inventive steel 3 | 940 | 618 | 77 | 782 | 535 | Inventive example 3 |
| Inventive steel 4 | 830 | 615 | 81 | 768 | 540 | Inventive example 4 |
| Inventive steel 5 | 920 | 620 | 81 | 780 | 535 | Inventive example 5 |
| Inventive steel 6 | 933 | 622 | 71 | 790 | 535 | Inventive example 6 |
| Comparative steel 1 | 842 | 710 | 72 | 791 | 550 | Comparative example 5 |
| Comparative steel 2 | 923 | 690 | 70 | 720 | 580 | Comparative example 6 |
| Comparative steel 3 | 911 | 618 | 70 | 820 | 610 | Comparative example 7 |
| Comparative steel 4 | 935 | 620 | 77 | 780 | 535 | Comparative example 8 |

TABLE 3

| Steel type | YS (MPa) | TS (MPa) | T-El (%) | r value | Average Grain size (μm) | Ratio of fine grains (≤6 μm) (%) | Surface nano-hardness | Reference |
|---|---|---|---|---|---|---|---|---|
| Inventive steel 1 | 310 | 445 | 32 | 1.7 | 7.2 | 8 | 1.2 | Inventive example 1 |
| | 268 | 425 | 36 | 2 | 13 | 2 | 0.8 | Comparative example 1 |
| | 295 | 440 | 33 | 1.7 | 9 | 3.8 | 0.9 | Comparative example 2 |
| Inventive steel 2 | 305 | 460 | 30 | 1.6 | 7 | 6 | 1.4 | Inventive example 2 |
| | 285 | 430 | 33 | 1.7 | 10 | 4.2 | 0.8 | Comparative example 3 |
| | 305 | 441 | 33 | 1.7 | 11 | 4 | 0.9 | Comparative example 4 |
| Inventive steel 3 | 311 | 454 | 32 | 1.6 | 8 | 5.3 | 1.5 | Inventive example 3 |
| Inventive steel 4 | 299 | 480 | 29 | 1.5 | 4.5 | 7 | 1.3 | Inventive example 4 |
| Inventive steel 5 | 289 | 442 | 33 | 1.4 | 4 | 6.9 | 1.17 | Inventive example 5 |
| Inventive steel 6 | 310 | 456 | 32 | 1.7 | 8 | 9 | 1.43 | Inventive example 6 |

TABLE 3-continued

| Steel type | YS (MPa) | TS (MPa) | T-El (%) | r value | Average Grain size (μm) | Ratio of fine grains (≤6 μm) (%) | Surface nano-hardness | Reference |
|---|---|---|---|---|---|---|---|---|
| Comparative steel 1 | 275 | 420 | 31 | 1.6 | 18 | 3 | 0.69 | Comparative example 5 |
| Comparative steel 2 | 620 | 694 | 25 | 0.9 | 26 | 4.5 | 0.78 | Comparative example 6 |
| Comparative steel 3 | 301 | 435 | 31 | 1.9 | 14 | 4 | 0.9 | Comparative example 7 |
| Comparative steel 4 | 288 | 433 | 33 | 1.8 | 12 | 4.6 | 0.85 | Comparative example 8 |

As illustrated in Tables 1 to 3 described above, it can be seen that Inventive Examples 1 to 6, satisfying not only steel composition components but also conditions of the manufacturing process of the plated steel sheet within the scope of the present disclosure, exhibit excellent tensile properties, r values, ultra-file grain ratios, and surface nanohardness.

In contrast thereto, Comparative Examples 1 to 4 illustrates a case in which the steel composition components satisfy the scope of the present disclosure, but the manufacturing process of the plated steel sheet deviates from the scope of the present disclosure.

Specifically, in Comparative Example 1 and Comparative Example 3, an annealing temperature was higher than 830° C., and the grain size was not sufficiently fine, so the desired tensile strength and surface nanohardness value did not be secured. In Comparative Example 2 and Comparative Example 4, as a finish mill delivery temperature (EDT) in the hot-rolling process was below an Ar3 temperature, a grain size of a surface layer increased, so that a ratio of fine grains in the final annealed structure was low so that desired surface hardness could not be secured.

In addition, in Comparative Examples 5 to 7, in which not only the steel composition components but also the plated steel sheet manufacturing process conditions was outside of the scope of the present disclosure, the ratio of ultra-fine grains was not satisfied and the surface nanohardness value was also insufficient, so that the desired strength could not be secured. In particular, in Comparative Example 6, it can be seen that an annealing temperature is too low so that sufficient recrystallization does not occur, so that a fraction of ultra-fine grains and strength thereof are satisfied, but elongation and a formability r value are not satisfied.

In addition, Comparative Example 8 is a case in which Relation 1 in the steel composition is outside of the scope of the present disclosure, and even when a plated steel sheet is manufactured by the process for manufacturing the plated steel sheet of the present disclosure, it can be confirmed that a sufficient fraction of fine grains cannot be secured, so that a desired surface nanohardness value may not be secured.

Meanwhile, FIG. 1 is a graph illustrating a correlation between a ratio of ultra-fine grains having an average grain size of 6 μm or less and the surface hardness in Examples of the present disclosure.

While example embodiments have been shown and described above, it will be apparent to those skilled in the art that modifications and variations could be made without departing from the scope of the present disclosure as defined by the appended claims.

The invention claimed is:

1. A high-strength hot-dip galvanized steel sheet having excellent formability, the steel sheet comprising in mass %: 0.005 to 0.009% of C; 0.05% or less of Si; 0.3 to 0.8% of Mn; 0.06 to 0.09% of P; 0.01% or less of S; 0.005% or less of N; 0.1% or less of S·Al; 0.05 to 0.08% of Mo; 0.01 to 0.03% of Ti; 0.03 to 0.045% of Nb; 0.06 to 0.1% of Cu; 0.0015% or less of B; and a balance of Fe and inevitable impurities, wherein C, Ti, and Nb satisfy Relation 1, the steel sheet has a microstructure including 95% or more of ferrite in terms of area fraction, the ferrite has an average grain size of 15 μm or less, with ultrafine grains of 6 μm or less occupying 5 to 10% in a 1 mm×1 mm area, and the steel sheet has a surface nanohardness value of 1 to 1.5 GPa, $$0.05 \leq [(Nb(48/93))+(Ti(93/48))+(C(12/48))] \leq 0.065. \quad \text{[Relation 1]}$$

2. The high-strength hot-dip galvanized steel sheet having excellent formability of claim 1, wherein the hot-dip galvanized steel sheet has tensile strength of 440 MPa or more and an r value of 1.4 or more.

* * * * *